US008032454B2

(12) United States Patent
Felton et al.

(10) Patent No.: US 8,032,454 B2
(45) Date of Patent: Oct. 4, 2011

(54) IMPORT DECLARATION/FOREIGN SUPPLIER INVOICE PAYMENT RECONCILIATION PROCESS

(75) Inventors: Robert S. Felton, Berthoud, CO (US); William S. Skubish, Erie, CO (US); Ronald P. Varra, Louisville, CO (US)

(73) Assignee: International Business Machines Corporation, Armonk, NY (US)

( * ) Notice: Subject to any disclaimer, the term of this patent is extended or adjusted under 35 U.S.C. 154(b) by 2702 days.

(21) Appl. No.: 09/982,225

(22) Filed: Oct. 18, 2001

(65) Prior Publication Data

US 2003/0078885 A1  Apr. 24, 2003

(51) Int. Cl.
*G06Q 10/00* (2006.01)
*G06Q 40/00* (2006.01)
*G07B 17/00* (2006.01)
*G07F 19/00* (2006.01)

(52) U.S. Cl. .............................. 705/40; 705/28; 705/30
(58) Field of Classification Search .................. 705/28, 705/30, 40
See application file for complete search history.

(56) References Cited

U.S. PATENT DOCUMENTS

| 6,044,362 | A | 3/2000 | Neely | |
|---|---|---|---|---|
| 6,052,674 | A | 4/2000 | Zervides et al. | |
| 6,151,588 | A | 11/2000 | Tozzoli et al. | |
| 6,167,385 | A | 12/2000 | Hartley-Urquhart | |
| 6,205,433 | B1 | 3/2001 | Boesch et al. | |
| 6,249,772 | B1 | 6/2001 | Walker et al. | |
| 2002/0095355 | A1* | 7/2002 | Walker et al. | 705/26 |
| 2002/0120561 | A1* | 8/2002 | Chin et al. | 705/38 |

FOREIGN PATENT DOCUMENTS

WO   WO 99/34272   7/1999

OTHER PUBLICATIONS

Fabey, Michael. Brazil Cracks Down. Journal of Commerce; New York: Nov. 16, 1998. (3 pages).*
Turner, Wayne C. et al. Introduction to Industrial and Systems Engineering, 3rd ed. Prentice Hall, 1993. pp. 520-521.*
Biederman, David. "Shipper, Audit Thyself". Journal of Commerce. New York: Jan. 25, 1999. (3 pages).*
Ahrens, Roger. "Software solutions for global traders". International Business. Rye: May/Jun. 1997. vol. 10, Iss. 4. (3 pages).*
"Making the most of an internal audit when Customs comes calling". Journal of Commerce. New York: Dec. 23, 1998. (3 pages).*

* cited by examiner

*Primary Examiner* — Shahid Merchant
(74) *Attorney, Agent, or Firm* — Gibb I.P. Law Firm, LLC; Derek S. Jennings

(57) ABSTRACT

A system and method for verifying the value of goods on a supplier invoice comprises inputting a first value (import declaration value) and second value (payment invoice value) of imported goods in a computer system, and comparing the values. Next, a user is alerted if the values are unequal, or a payment is made if the values are equal. Then, the process is repeated for subsequent invoices. The values are compared for every occurrence, or alternatively, it occurs selectively. The method further comprises selecting a statistical sample of invoices having the first value greater than a predetermined amount. Alternatively, the method comprises selecting a statistical random sample from all invoices in the system, and identifying an amount of occurrences of unequal values, attributed to a common supplier. Then, all invoices of the common supplier are selected if the amount of occurrences exceeds a predetermined amount, and the user is alerted.

18 Claims, 3 Drawing Sheets

IMPORT DECLARATION/FOREIGN SUPPLIER INVOICE PAYMENT RECONCILIATION PROCESS

BACKGROUND OF THE INVENTION

1. Field of the Invention

The present invention generally relates to automated invoice systems and methods, and more particularly to an automated invoice system for verifying compliance with United States Customs regulations on imported goods.

2. Description of the Related Art

Generally, import declarations on the value of imported goods are made at the time goods come into the United States. The importer must declare the dutiable value of merchandise. The final appraisement is fixed by the United States Customs Service. Several appraisement methods are used to arrive at this value. The transaction value serves as the primary basis of appraisement, wherein the transaction value is the price actually paid or payable by the buyer (supplier) to the seller for the goods imported. Other factors may also add to the dutiable value of merchandise, such as packing costs, selling commissions, royalty or licensing fees, etc. When the transaction value cannot be determined, then the value of the imported goods being appraised is the transaction value of identical merchandise. However, if merchandise identical to the imported goods cannot be found, or an acceptable transaction value for such merchandise does not exist, then the value is the transaction value of similar merchandise. Similar merchandise means merchandise that is produced in the same country and by the same person as the merchandise being appraised. It must be commercially interchangeable with the merchandise being appraised. Moreover, the identical or similar merchandise must have been exported to the United States at or about the same time the merchandise being appraised is exported to the United States.

However, invoices from foreign suppliers are usually submitted sometime thereafter. Occasionally, audits are performed by the United States Customs Service to verify and compare the value of the goods as declared versus the value as actually paid (as indicated on a paid invoice). Under 19 U.S.C. 1509, the United States Customs Service may examine records to ascertain the correctness and determine the importers' liability for duty, fees and taxes due the United States.

Conventional systems perform this verification process at the time when an audit occurs (usually by a random sampling of declarations), which precipitates a company to scramble to get the invoices, proof of payment, and other documentation that match a given declaration, in order to prove the actual value paid for the goods.

U.S. Pat. No. 6,151,588 issued to Tozzoli, et al., the complete disclosure of which is herein incorporated by reference, teaches a system of facilitating payment for transactions involving international sales of goods, whereby the seller is a foreign entity. However, the system disclosed in Tozzoli only verifies that each portion of a transaction, for a sale of goods, relates to the corresponding purchase order and criteria established by the funder, which is usually a bank, and possibly by the trade system, and then generates payment instructions accordingly.

However, this system, and others like it, suggests that the criterion for deciding whether payment is to be made is determined by the entity providing the funding, and not necessarily the trade system; i.e., the statutes and regulations governing importing/exporting, namely, those regulations pertaining to the United States Customs Service. Furthermore, most conventional systems do not necessarily verify if the transaction complies with United States Customs Service regulations; at least not before the invoice is paid and the aforementioned auditing process occurs.

Thus, there is a need for a new and improved system, which performs the verification (matching of the declaration and invoice for value of goods) before the invoice is paid and before an audit occurs.

SUMMARY OF THE INVENTION

In view of the foregoing and other problems, disadvantages, and drawbacks of the conventional invoice systems, the present invention has been devised, and it is an object of the present invention to provide a system and method for verifying that an import declaration matches a corresponding invoice for the value of the goods sold. It is another object of the present invention to provide a process to ensure that vendor billings have a related entry reported to the United States Customs Service. Still another object of the present invention is to provide a process, which ensures compliance with United States Customs Service regulations. Yet another object of the present invention is to provide a method, which ensures that proper import declarations are made to the United States government. Another object of the present invention is to provide a system and process to ensure that what a purchaser pays for imported goods corresponds with what is declared by in import declarations made to the United States Customs Service.

In order to attain the objects suggested above, there is provided, according to one aspect of the invention, a system and method for verifying the value of goods on a supplier invoice, comprising first, inputting a first value of imported goods in a data processing system. Second, a second value of imported goods is inputted in the data processing system. Next, the first value is compared with the second value. Then, a logic step is performed, wherein the logic step comprises one of alerting a user if the first value does not equal the second value; and making an automated payment if the first value equals the second value. Next, the method is repeated for subsequent supplier invoices.

The step of inputting the first value of imported goods into the data processing system comprises inputting a value claimed on an import declaration, and the step of inputting the second value of imported goods into the data processing system comprises inputting a value claimed on a payment invoice.

Preferably, the step of comparing the first value with the second value occurs for every occurrence of inputting the first value of imported goods into the data processing system and the step of inputting the second value of imported goods into the data processing system. Alternatively, the step of comparing the first value with the second value occurs selectively.

The method further comprises selecting a statistical sample of supplier invoices having the first value greater than a predetermined amount. Moreover, the method further comprises selecting a statistical random sample from all supplier invoices in the data processing system, and identifying an amount of occurrences of unequal first values compared with second values, attributed to a common supplier. The method further comprises selecting all invoices of the common supplier if the amount of occurrences exceeds a predetermined amount, and then alerting the user. The method is embodied in a network or system, wherein various operations perform the above-identified methods.

BRIEF DESCRIPTION OF THE DRAWINGS

The foregoing and other objects, aspects and advantages will be better understood from the following detailed description of the preferred embodiments of the invention with reference to the drawings, in which.

DETAILED DESCRIPTION OF PREFERRED EMBODIMENTS OF THE INVENTION

As previously mentioned, there is a need for a system and method for verifying the value of goods stated in an import declaration with the value invoiced by a foreign supplier. The claimed invention addresses this need by providing a system and method for verification (matching of declaration and invoice for value of goods in compliance with United States Customs regulations) before the invoice is paid and before an audit occurs.

The verification process, as embodied in the claimed invention, is part of the invoice payment process and payment is not made until discrepancies are resolved. This allows lift the invention to identify problems to a given supplier and have easy access to information in the case of an audit. The process can be performed on all invoices or a random sampling to simulate an audit. As such, the claimed invention provides a method of verifying the aforementioned compliance using statistical analysis to select a greater frequency sample in order to identify and isolate "problem" suppliers. Prior to this process, and using conventional systems and methods, vendor billings were paid with no determination of import, creating an exposure to a possible audit with the United States Customs Service, and liability on proper entry and valuation.

Figure 1:
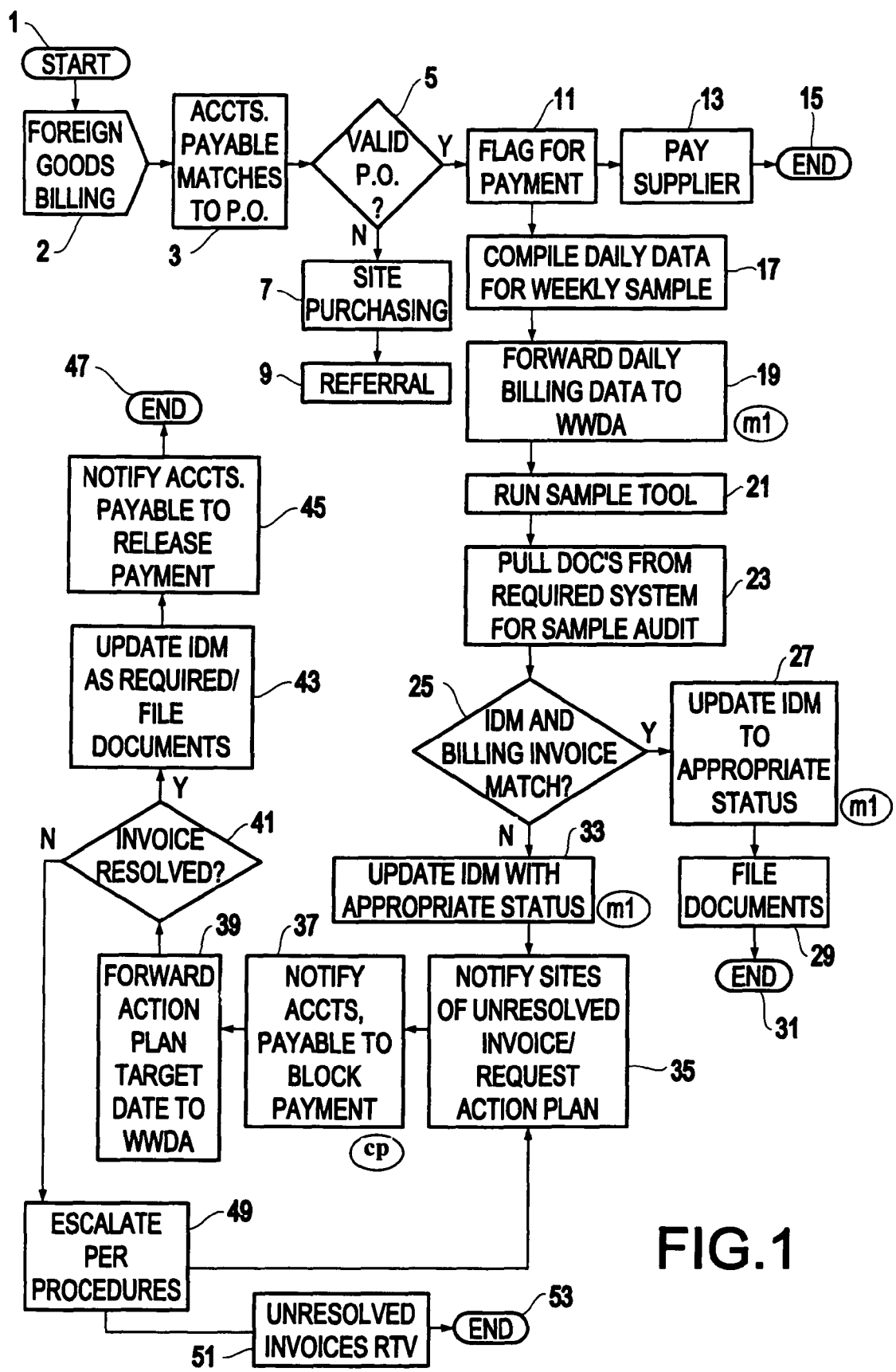
FIG. 1 is a flow diagram illustrating a preferred method of the present invention.
Figure 2:
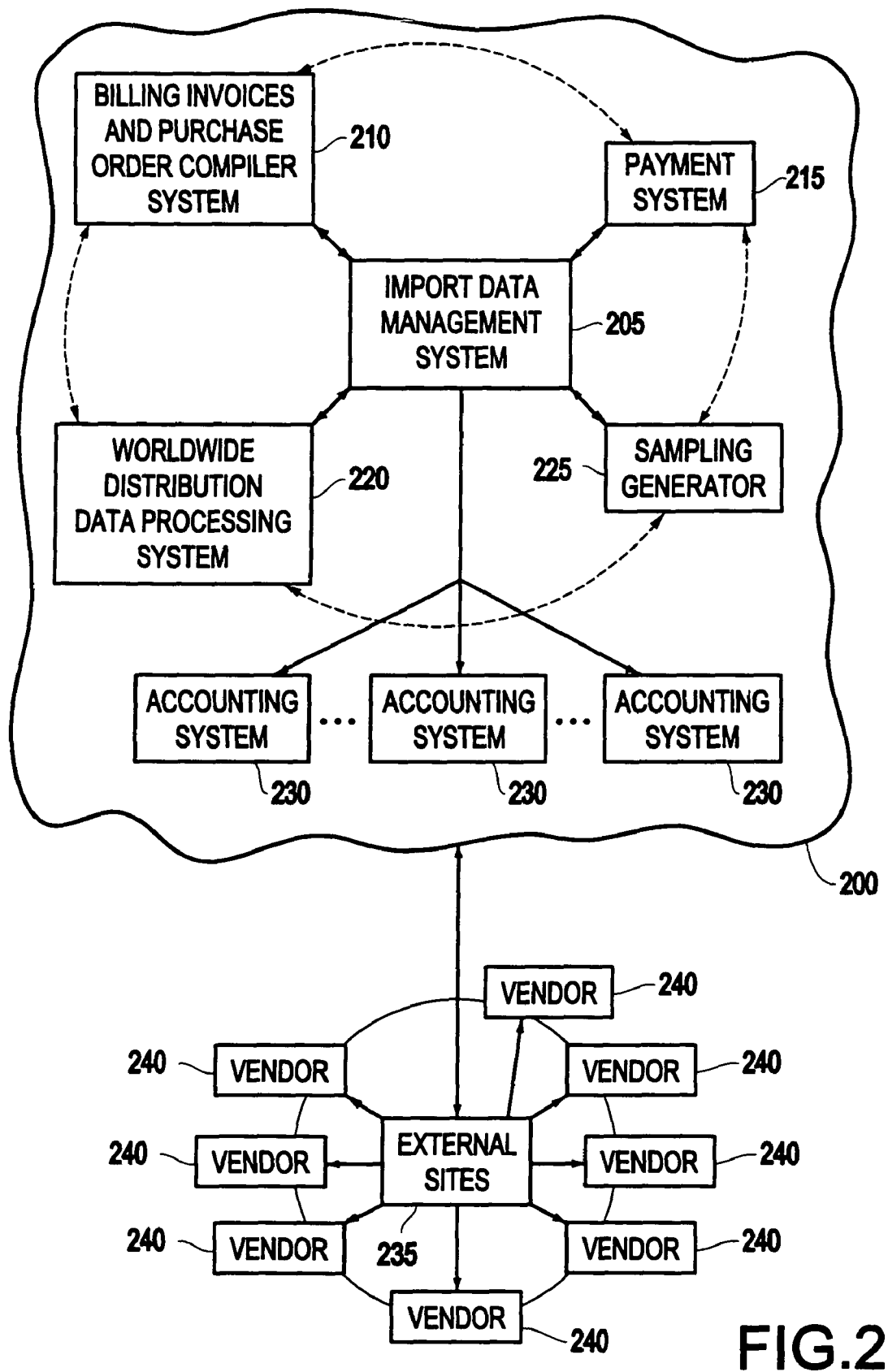
FIG. 2 is a flow diagram illustrating a preferred method of the present invention.
Figure 3:
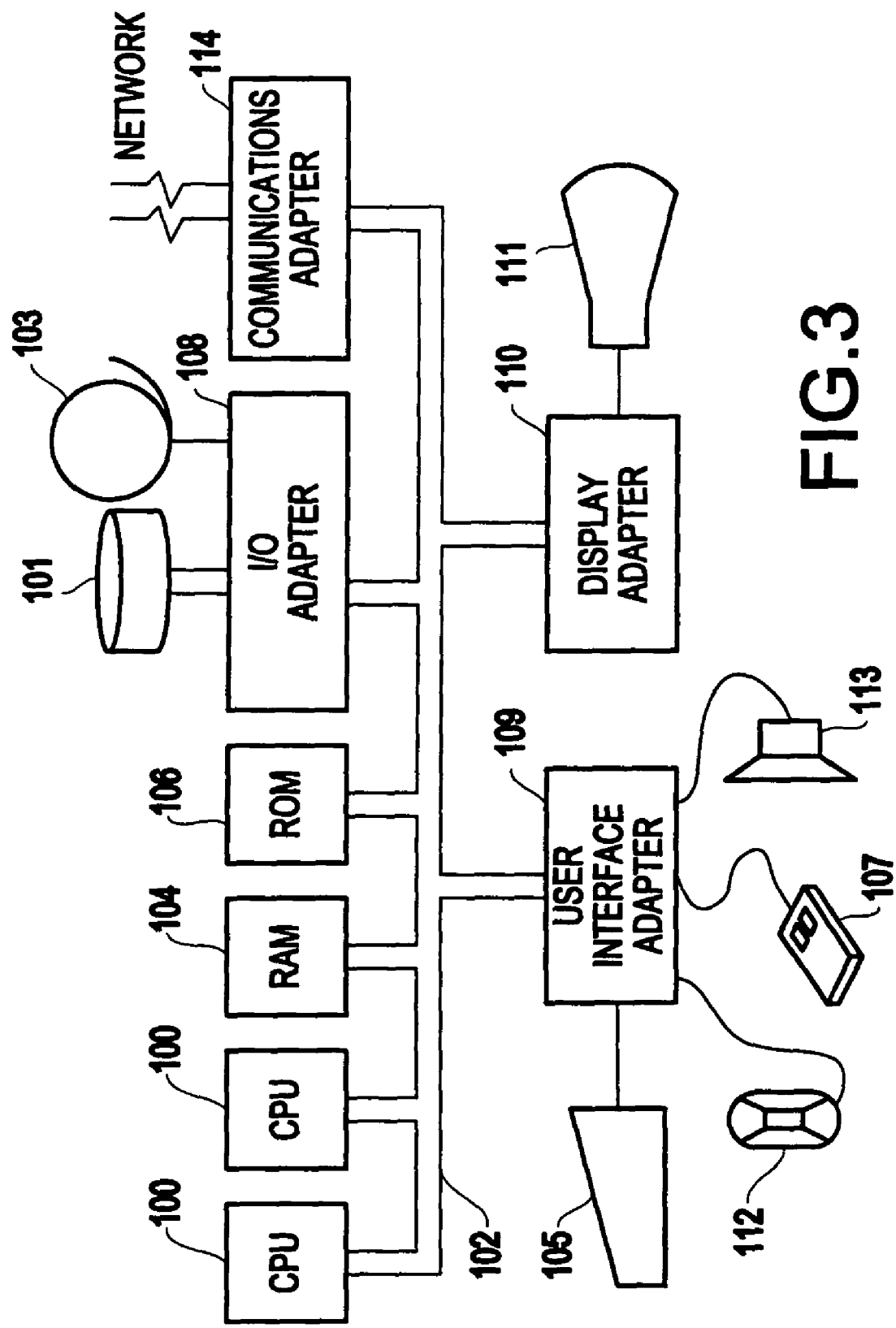
FIG. 3 is a system diagram according to the present invention.

Referring now to the drawings, and more particularly to FIGS. 1 through 3, there are shown preferred embodiments of the system and method according to the present invention. Specifically, in FIG. 1, there is shown a flow diagram illustrating a preferred method of the present invention, in which the process for verifying a value of goods on a supplier invoice comprises inputting data into a data management system 200.

The process begins 1 by inputting 2 the value listed on a foreign goods billing invoice into the system. Next, the inputted value is sent 3 to an accounts payable directory, which matches the foreign goods invoice to a corresponding purchase order (P.O.). Then, the system performs a decision step 5, wherein it is determined whether the purchase order is valid. If the system determines that the purchase order is not valid (N), then a subsequent validating process occurs 7, whereby the buyer must validate the purchase order, and if it is not validated, then the billing invoice is returned 9 to the supplier.

However, if the system determines that the purchase order is valid (Y), then the billings from the invoice are sent 11 to a payment process, where two simultaneous processes occur. First, the billings are posted for payment, upon which the system automatically sets payment 13 to contract terms, e.g., net 45 days, and the process ends 15. Second, all supplier billings received from the accounts payable directory, based on the daily data inputted into the system, are generated and a weekly sample is compiled 17. Next, the billing data is forwarded 19 to a worldwide distribution data processing system, which is an internal measurement system. The sampling generator 225 creates a random statistical sample, which simulates a sample selected by the United States Customs Service when an auditing procedure occurs. Preferably, the sampling generator 225 creates a random statistical sample, using a higher sampling size than that ordinarily used in United States Customs Service audits. Alternatively, the sampling generator may use all invoices compiled in the system for its sampling size.

Nonetheless, this step of the process involves running a random sample 21 of approximately 30 invoices. Here, after the daily data has been consolidated into the weekly sample, a random sample is generated 21. Next, documents, including billing invoices, are reviewed from different accounting data systems, depending on whether the documents are electronic or in hard copy format. In this step, a sample audit is performed 23.

Here, a check is performed of whether the import declaration value of goods matches the value listed on the billing invoice 25. The import declaration value of goods is stored on a separate import data management system. If the values match (Y), then it is so indicated on the import data management system 27, which is an internal measurement system, after which the documents are filed 29, and the process ends 31. If, however, the values do not match (N), then it is so indicated on the import data management system 33, which is an internal measurement system, and the appropriate sites are notified 35 of the unresolved discrepancy in values. Here, a request for an action plan occurs via an information request tool.

After the notification step, the system is alerted 37 to block payments to the suppliers using an internal control operation/system. Then, the affected sites are requested to forward an action plan 39, and a target date to the worldwide distribution data processing system. Upon completion of this step, another logic process occurs 41, wherein it is determined whether the discrepancy in the invoice is resolved. If the discrepancy is resolved (Y), then an update on the import data management system occurs, and all documents are filed 43. After which, the internal control operation/system releases payment to the supplier 45, and the process ends 47.

However, if the discrepancy is not resolved (N), then the system is alerted 49, and steps 35 through 41 are repeated until the discrepancy is resolved. Alternatively, in lieu of and/or in addition to repeating steps 35 through 41, the unresolved invoices are returned to the appropriate and/or corresponding vendors (suppliers) 51, upon which the process ends 53.

FIG. 2 depicts the entire system 200 as a neural network, in which the various sub-systems co-communicate with one another. As illustrated, the import data management system 205 co-communicates with the billing invoices and purchase order compiler system 210, the payment system 215, the worldwide distribution data processing system 220, the sampling generator 225, and all accounting systems 230, and vice versa. The system 200 then communicates with the external systems 235, which in turn communicate with each individual vendor 240. Each operation in the system is interconnected with one another by network lines illustrated as dotted and complete lines and arrows.

Through its notification procedures 35, 37, the system 200 identifies and targets those unresolved invoices attributed to a common supplier, thereby alerting the user of a "problem" supplier; that is, a supplier who routinely has discrepancies in its claimed declaration values and its invoice values. The system 200 can do this for all occurrences, or alternatively, only levels at or above a predetermined amount of discrepancies attributed to a common supplier which will alert the user.

FIG. 3 illustrates a system diagram according to the present invention, wherein a representative hardware environment for practicing the present invention is depicted as the diagram illustrates a typical hardware configuration of an information handling/computer system in accordance with the subject invention, having at least one processor or central processing unit (CPU) 100. CPUs 100 are interconnected via system bus 102 to random access memory (RAM) 104, read-only memory (ROM) 106, an input/output (I/O) adapter 108 for connecting peripheral devices, such as disk units 101 and tape drives 103, to bus 102, user interface adapter 109 for connecting keyboard 105, mouse 107, speaker 112, microphone 113, and/or other user interface devices such as touch screen device (not shown) to bus 102, communication adapter 114 for connecting the information handling system to a data processing network, and display adapter 110 for connecting bus 102 to display device 111. A program storage device readable by the disk or tape units, is used to load the instructions which operate on a wiring interconnect design which is also loaded onto the computer system.

The benefits of this invention are several, and include ensuring compliance with U.S. Customs regulations, and to ease in the preparation for U.S. Customs/company internal audits. Moreover, this process can be used in any import payment process regardless of the type of product involved. Also, the issues with problematic supplies are resolved in the early stages of the billing process.

While the invention has been described in terms of preferred embodiments, those skilled in the art will recognize that the invention can be practiced with modification within the spirit and scope of the appended claims.

What is claimed is:

1. A method for verifying a value of goods on a supplier invoice, said method comprising:
    compiling a daily input of supplier invoice data into a weekly statistical sample of supplier invoices in a data processing system, wherein said statistical sample comprises a sampling size greater than a sampling size used in United States Customs Service audits, and wherein said sampling size equals exactly a total number of all supplier invoices compiled in said data processing system;
    inputting a first value of imported goods in said data processing system, said inputting of said first value comprising inputting a value claimed on an import declaration;
    inputting a second value of imported goods in said data processing system, said inputting of said second value comprising inputting a value claimed on a payment invoice;
    selectively comparing said first value with said second value;
    performing a logic step, wherein said logic step comprises one of:
        alerting a user if said first value does not equal said second value; and
        making an automated payment if said first value equals said second value; and
    repeating said method for subsequent supplier invoices.

2. The method according to claim 1, wherein said step of comparing said first value with said second value occurs for every occurrence of said inputting a first value of imported goods into a data processing system and said step of inputting a second value of imported goods into said data processing system.

3. The method according to claim 1, wherein said sampling size is approximately 30 supplier invoices.

4. The method according to claim 1, further comprising selecting a statistical sample of supplier invoices having said first value greater than a predetermined amount.

5. The method according to claim 1, further comprising selecting a statistical random sample from all supplier invoices in said data processing system, and identifying an amount of occurrences of unequal first values compared with second values, attributed to a common supplier.

6. The method according to claim 5, further comprising selecting all invoices of said common supplier if said amount of occurrences exceeds a predetermined amount, and alerting said user.

7. A computer system executing a method for verifying a value of goods on a supplier invoice, said computer system comprising:
    a sampling generator adapted to compile, in a data processing system, a daily input of supplier invoice data into a weekly statistical sample of supplier invoices, wherein said statistical sample comprises a sampling size greater than a sampling size used in United States Customs Service audits, wherein said sampling size equals exactly a total number of all supplier invoices compiled in said data processing system, wherein said data processing system is adapted to have a first value and a second value of imported goods being input therein, wherein said first value comprises a value claimed on an import declaration, and wherein said second value comprises a value claimed on a payment invoice;
    an input data management system adapted to selectively compare said first value with said second value; and
    a logic component comprising:
        an alert component adapted to alert a user if said first value does not equal said second value; and
        a payment system adapted to make an automated payment if said first value equals said second value.

8. The computer system according to claim 7, wherein the comparison of said first value with said second value occurs for every occurrence of the inputting of said first value of imported goods into a data processing system and the inputting of said second value of imported goods into said data processing system.

9. The computer system according to claim 7, wherein said sampling size is approximately 30 supplier invoices.

10. The computer system according to claim 7, wherein said sampling generator is further adapted to generate and select a statistical sample of supplier invoices having said first value greater than a predetermined amount.

11. The computer system according to claim 7, wherein said sampling generator is further adapted to generate and select a statistical random sample from all supplier invoices in said data processing system, and identify an amount of occurrences of unequal first values compared with second values attributed to a common supplier.

12. The computer system of according to claim 11, wherein said sampling generator is further adapted to select all invoices of said common supplier if said amount of occurrences exceeds a predetermined amount, and alert said user.

13. A program storage device readable by machine, tangibly embodying a program of instructions executable by the machine to perform a method for verifying an import declaration with an invoice for value of goods, said method comprising:
    compiling a daily input of supplier invoice data into a weekly statistical sample of supplier invoices in a data processing system, wherein said statistical sample comprises a sampling size greater than a sampling size used in United States Customs Service audits, and wherein said sampling size equals exactly a total number of all supplier invoices compiled in said data processing system;

inputting a first value of imported goods in said data processing system, said inputting of said first value comprising inputting a value claimed on an import declaration;

inputting a second value of imported goods in said data processing system, said inputting of said second value comprising inputting a value claimed on a payment invoice;

selectively comparing said first value with said second value;

performing a logic step, wherein said logic step comprises one of:
  alerting a user if said first value does not equal said second value; and
  making an automated payment if said first value equals said second value; and
repeating said method for subsequent supplier invoices.

14. The program storage device according to claim 13, wherein in said method, said step of comparing said first value with said second value occurs for every occurrence of said inputting a first value of imported goods into a data processing system and said step of inputting a second value of imported goods into said data processing system.

15. The program storage device according to claim 13, wherein said sampling size is approximately 30 supplier invoices.

16. The program storage device according to claim 13, wherein said method further comprises selecting a statistical sample of supplier invoices having said first value greater than a predetermined amount.

17. The program storage device according to claim 13, wherein said method further comprises selecting a statistical random sample from all supplier invoices in said data processing system, and identifying an amount of occurrences of unequal first values compared with second values, attributed to a common supplier.

18. The program storage device according to claim 17, wherein said method further comprises selecting all invoices of said common supplier if said amount of occurrences exceeds a predetermined amount, and alerting said user.

* * * * *